US 9,960,661 B2

(12) United States Patent
Ono et al.

(10) Patent No.: US 9,960,661 B2
(45) Date of Patent: May 1, 2018

(54) SKEW CORRECTION DEVICE FOR STATOR CORE AND SKEW CORRECTION METHOD

(71) Applicant: HONDA MOTOR CO., LTD., Tokyo (JP)

(72) Inventors: Kenichi Ono, Tochigi (JP); Manabu Yamamoto, Tochigi (JP); Hideaki Onda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 15/019,440

(22) Filed: Feb. 9, 2016

(65) Prior Publication Data

US 2016/0241115 A1    Aug. 18, 2016

(30) Foreign Application Priority Data

Feb. 12, 2015  (JP) .................................. 2015-024886

(51) Int. Cl.
*H02K 15/00*   (2006.01)
*H02K 15/14*   (2006.01)
(Continued)

(52) U.S. Cl.
CPC ......... *H02K 15/02* (2013.01); *H02K 2201/06* (2013.01)

(58) Field of Classification Search
CPC ........... H02K 3/46; H02K 3/314; H02K 3/52; H02K 15/028; H02K 15/067; H02K 15/085; H02K 15/15
See application file for complete search history.

(56) References Cited

U.S. PATENT DOCUMENTS 3,778,892 A * 12/1973 Ostroski ............... H02K 15/00
156/294
4,503,604 A *  3/1985 Rediger ............... H02K 15/024
156/291
(Continued)

FOREIGN PATENT DOCUMENTS

| CN | 203574508 U | 4/2014 |
|---|---|---|
| JP | 57-183251 | 11/1982 |
| JP | 2014-217227 | 11/2014 |

OTHER PUBLICATIONS

Japanese Notification of Reasons for Refusal dated Jan. 10, 2017.
Chinese Office Action dated Jan. 11, 2018, 7 pages.

*Primary Examiner* — Paul D Kim
(74) *Attorney, Agent, or Firm* — Rankin, Hill & Clark LLP

(57) ABSTRACT

A skew correction device is provided that can easily correct the skew in the circumferential direction of the stator core arising due to insertion of electrical conductors into each slot and twisting and bending of the leading ends thereof in the circumferential direction. A skew correction device (10) for stator cores (2), includes: a support member (71) capable of supporting from outwards a protrusion (5) formed by the plurality of projecting parts (21) aligning; a first pressurizing mechanism (72) for pressing the support member (71) towards an inner side in a radial direction; and a rotation mechanism (73) for correcting skew in the circumferential direction, by causing the support member (71) to rotate in a direction in which the skew in the circumferential direction is corrected by way of a rotating shaft (731), in a state supporting the protrusion (5) from outwards by pressing the support member (71).

8 Claims, 12 Drawing Sheets

(51) Int. Cl.
*H02K 15/16* (2006.01)
*H02K 15/02* (2006.01)

(56) References Cited

U.S. PATENT DOCUMENTS 6,301,773 B1 * 10/2001 Chemburkar ........ H02K 15/024
 156/269
8,201,316 B2 * 6/2012 Rippel ..................... H02K 1/20
 29/402.02

* cited by examiner

SKEW CORRECTION DEVICE FOR STATOR CORE AND SKEW CORRECTION METHOD

This application is based on and claims the benefit of priority from Japanese Patent Application No. 2015-024886, filed on 12 Feb. 2015, the content of which is incorporated herein by reference.

BACKGROUND OF THE INVENTION

Field of the Invention

The present invention relates to a stator core skew correction device and skew correction method.

Related Art

Conventionally, rotary electric machines such as electric motors and power generators that include a stator and rotor have been known. The stator of a rotary electric machine is usually produced in the following way.

First, a plurality of coil elements in which a plurality of electrical conductors is bundled to form a substantially U-shape is prepared. Next, the plurality of coil elements thus prepared is aligned in an annular shape while layering in a circumferential direction, and in this state, the leading end part of each electrical conductor is inserted in each slot arranged in parallel in an annular shape to the stator core. Next, the leading end part of the plurality of electrical conductors projecting from each slot is twisted and bent in the circumferential direction, by a conventional, known twisting and bending device (for example, refer to Patent Document 1). Subsequently, the stator of a rotary electrical machine is produced by joining the adjacent leading ends.

Patent Document 1: Japanese Unexamined Patent Application, Publication No. 2014-217227

SUMMARY OF THE INVENTION

However, stator cores are usually formed by laminating a plurality of thin sheets such as copper sheets having a plurality of projecting parts that project outwards on the outer circumference. Fastening holes are formed in the projecting parts, and in a state in which fastening members are inserted and jammed in these fastening holes (state in which positional shift can occur), inserting of the electrical conductors into each slot and twisting and bending of the leading ends thereof in the circumferential direction are performed. For this reason, lamination shift in which the layered thin sheets positionally shift in the circumferential direction (hereinafter also referred to as skew) occurs, and the development of a skew correction device and skew correction method that can easily correct for this skew have been demanded.

The present invention has been made taking account of the above-mentioned situation, and an object thereof is to provide a skew correction device and skew correction method for stators cores that can easily correction for skew in the circumferential direction of the stator core that occurred due to insertion of electrical conductors into each slot and twisting and bending of the leading ends thereof in the circumferential direction.

A first aspect of the present invention provides a skew correction device (e.g., the skew correction device 10 described later) for stator cores (e.g., the stator core 2 described later) that corrects a lamination shift in a circumferential direction of a substantially annular stator core formed by laminating a plurality of thin sheets (e.g., the copper sheet 20 described later) having a plurality of projecting parts (e.g., the projecting part 21 described later) projecting outwards at an outer circumference thereof so that the projecting parts align in a laminating direction, the device comprising: a support member (e.g., the support member 71 described later) capable of supporting from outwards a protrusion (e.g., the protrusion 5 described later) of the stator core formed by the plurality of projecting parts aligning; a first pressurizing means (e.g., the first pressurizing mechanism 72 described later) for pressing the support member towards an inner side in a radial direction of the stator core; and a rotation means (e.g., the rotation mechanism 73 described later) for correcting lamination shift in the circumferential direction, by causing the support member to rotate in a direction in which the lamination shift in the circumferential direction is corrected with the radial direction as an axis of rotation (e.g., the rotating shaft 731 described later), in a state supporting the protrusion from outwards by pressing the support member by way of the first pressurizing means.

The skew correction device for stator cores according to the first aspect of the present invention is provided with a support member capable of support from outwards a protrusion of the stator core formed by a plurality of the projecting parts aligning, and a first pressurizing means for pressing this support member towards an inner side in the radial direction of the stator core. In addition, in a state supporting the protrusion from outwards by pressing the support member by way of the first pressurizing mechanism, the rotation mechanism is provided that corrects the lamination shift in the circumferential direction by causing the support member to rotate in a direction in which lamination shift in the circumferential direction is corrected with the radial direction as the axis of rotation. It is thereby possible to easily correct skew in the circumferential direction of the stator core arising due to insertion of the electrical conductors into each slot and twisting and bending in the circumferential direction of the leading ends thereof, without conducting special processing, etc. on the stator core, for example.

According to the second aspect of the present invention, in the first aspect, it is preferable for at least a pair of the protrusions to be formed at positions that are symmetrical relative to a central axis (e.g., the central axis X described later) of the stator core, and the support member to support the pair of the protrusions (e.g., the pair of protrusions 5a, 5b and pair of protrusions 5c, 5d described later) by being disposed at positions corresponding to at least the pair of the protrusions, respectively.

With the skew correction device for stator cores according to the second aspect of the present invention, the support members are each arranged to correspond to at least one pair of protrusions that are symmetrical relative to the central axis of the stator core. Since it is thereby possible to correct skew in the circumferential direction via the pair of protrusions formed at positions that are symmetrical relative to the central axis of the stator core, skew can be corrected more easily.

According to a third aspect of the present invention, in the first or second aspect, it is preferable to further include: a positioning member (e.g., the positioning member 81 described later) that is configured by an upper member (e.g., the upper member 811 described later) provided at an upper side in the laminating direction and a lower member (e.g., the lower member 812 described later) provided at a lower side in the laminating direction, and that supports from outwards, by way of the upper member and the lower member, the protrusion at which the support member is not disposed; a second pressurizing means (e.g., the second pressurizing mechanism 82 described later) for pressurizing each of the upper member and the lower member to an inner side in the radial direction individually; a measuring means (e.g., the measuring unit 83 described later) for measuring a distance (e.g., the distance D described later) in the radial direction between a position at which the upper member pressurized by the second pressurizing means abuts the protrusion and stops, and a position at which the lower member pressurized by the second pressurizing means abuts the protrusion and stops; and a shift amount acquiring means (e.g., the control device 13 described later) for calculating and acquiring a lamination shift amount in the circumferential direction according to the distance measured by the measuring means.

The skew correction device for stator cores according to the third aspect of the present invention is provided with the positioning member that supports at least one of the protrusions at which the support member is not arranged, from outwards by the upper member and the lower member, and the second pressurizing means that individually presses this upper member and lower member to the inner side in the radial direction, respectively. In addition, provided are the measuring means that measures the distance in the radial direction between the position at which the pressurized upper member abuts the protrusion and stops, and the position at which the pressurized lower member abuts the protrusion and stops, and a shift amount acquisition means that calculates and acquires a lamination shift amount in the circumferential direction according to the measured distance.

Herein, the distance in the radial direction between the position at which the pressurized upper member abuts the protrusion and stops and the position at which the pressurized lower member abuts the protrusion and stops has a correlation with the lamination shift amount (skew amount) in the circumferential direction; therefore, the skew amount can be acquired by measuring this distance.

It is thereby possible to set the rotation amount of the rotation means according to the acquired skew amount, by acquiring the skew amount before correction, for example. In addition, it is possible to execute skew correction while confirming the skew amount, by acquiring the skew amount in the middle of correcting. Furthermore, it is possible to confirm whether or not skew has been eliminated by acquiring the skew amount after correction.

A fourth aspect of the present invention provides a skew correction method for stator cores that corrects lamination shift in a circumferential direction of a substantially annular stator core formed by laminating a plurality of thin sheets having a plurality of projecting parts projecting outwards at an outer circumference so that the projecting part align in a laminating direction, the method including: a supporting step of pressing a support member towards an inner side in a radial direction of the stator core against at least one protrusion of the stator core formed by the plurality of projecting parts aligning, thereby supporting the protrusion from outwards; and a correcting step of correcting the lamination shift in the circumferential direction by causing the support member to rotate in a direction in which the lamination shift in the circumferential direction is corrected with the radial direction as a rotation axis.

Similar effects to the skew correction device for stator cores according to the first aspect of the present invention are exerted according to the skew correction method for stator cores according to the fourth aspect of the present invention.

According to a fifth aspect of the present invention, in the fourth aspect, it is preferable for at one pair of the protrusions to be formed at positions that are symmetrical relative to a central axis of the stator core, and the supporting step to support the pair of the protrusions by arranging the support members at positions corresponding at least to the pair of the protrusions, respectively.

Similar effects to the skew correction device for stator cores according to the second aspect of the present invention are exerted according to the skew correction method for stator cores according to the fifth aspect of the present invention.

According to a sixth aspect of the present invention, in the fourth or fifth aspect, it is preferable to further include a shift amount acquisition step of acquiring a lamination shift amount in the circumferential direction, in at least any of before the correcting step, during the correcting step and after the correcting step.

Similar effects to the skew correction device for stator cores according to the third aspect of the present invention are exerted according to the skew correction method for stator cores according to the sixth aspect of the present invention.

According to the present invention, it is possible to provide a skew correction device for stator cores and a skew correction method that can easily correct skew in the circumferential direction of the stator core occurring from insertion of electrical conductors into each slot, and twisting and bending of the leading ends thereof in the circumferential direction.

DETAILED DESCRIPTION OF THE INVENTION

Hereinafter, an embodiment of the present invention will be explained in detail while referencing the drawings. It should be noted that, in the explanation of the second embodiment, the same reference symbols are assigned for configurations shared with the first embodiment, and explanations thereof will be omitted as appropriate. In addition, in the following explanation, the side of the electrical conductor at which the head portion is arranged is defined as the up side.

First Embodiment

A skew correction device for stator cores according to the present embodiment is a device that corrects the skew in the circumferential direction of the stator core. In more detail, it is a device that corrects skew in the circumferential direction of a stator core produced by insertion of the electrical conductors into each slot and twisting and bending of the leading ends thereof in the circumferential direction. First, before explaining the skew correction device for stator cores according to the present embodiment, the stator of a rotary electric machine on which the correction of skew is performed according to the present embodiment will be explained.

Figure 1:
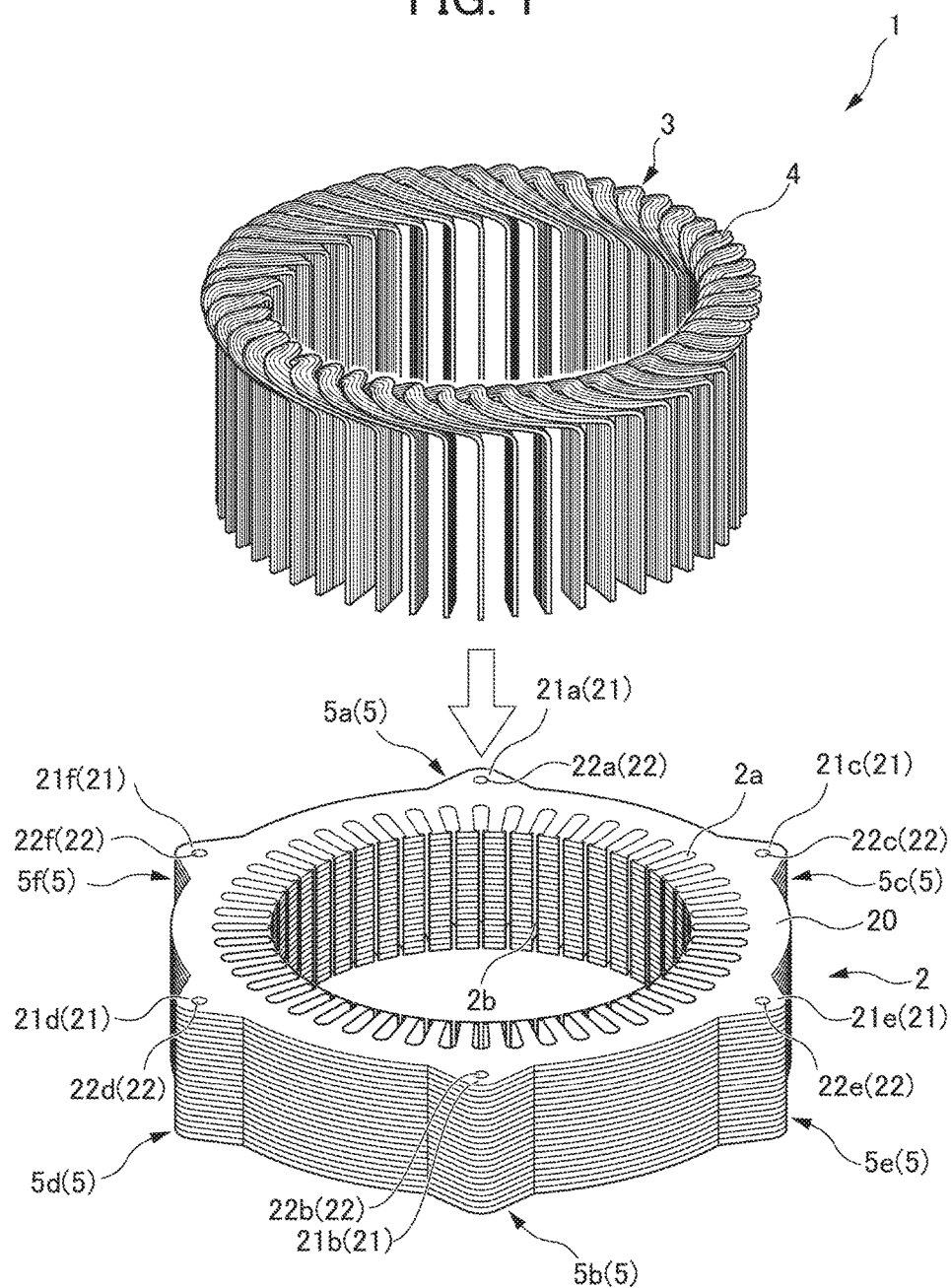
FIG. 1 is a disassembled perspective view of a stator.
Figure 2:
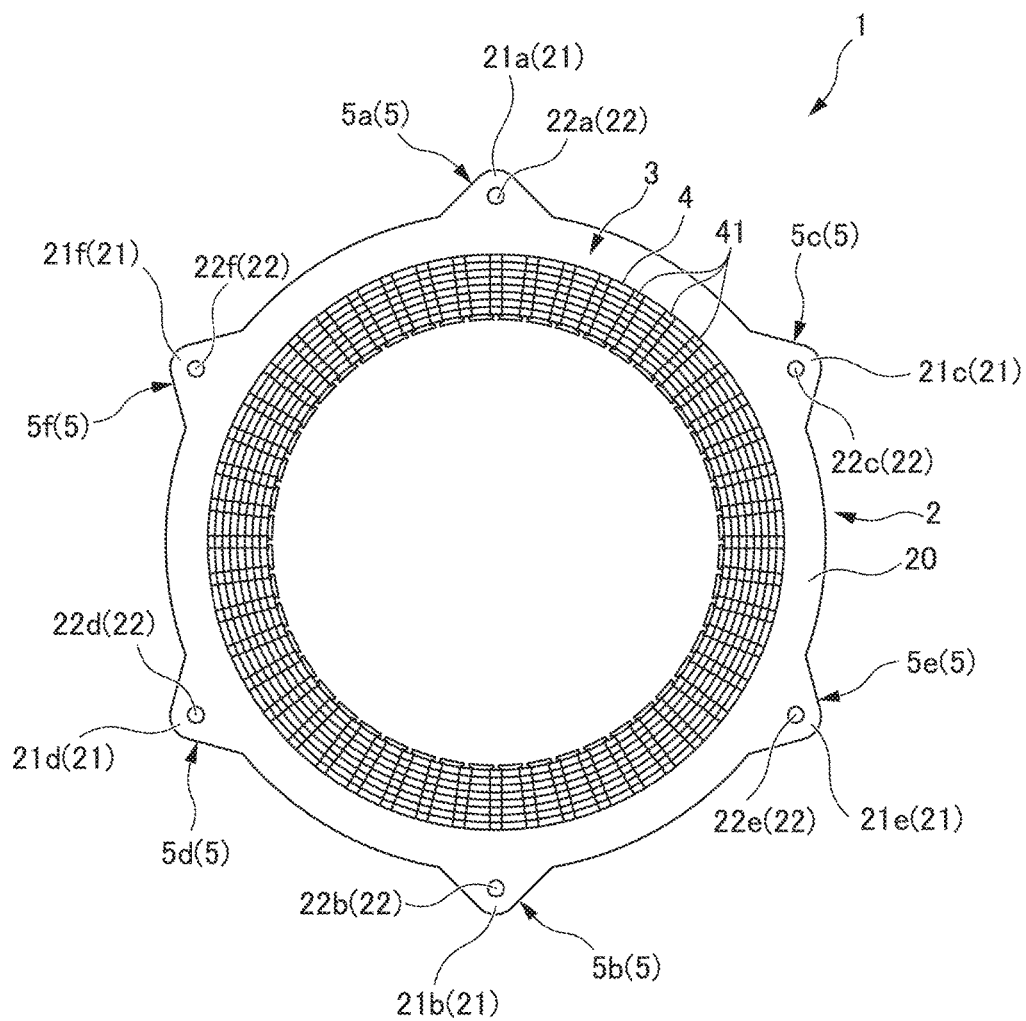
FIG. 2 is a plan view of a stator.

FIG. 1 is a disassembled perspective view of a stator 1. In addition, FIG. 2 is a plan view of the stator 1. As shown in FIG. 2, the side of the leading end 41 of each electrical conductor 40 is defined as upwards of the stator 1 in the following.

As shown in FIGS. 1 and 2, the stator 1 is formed in a substantially annular shape, and is configured to include a stator core 2 and coil 3. A rotary electric machine is configured by a rotor (not illustrated) being arranged to be rotatable at the inner side of the stator 1.

The stator core 2 is formed in a substantially annular shape. A plurality of slots 2a penetrating in the rotational axis (central axis of stator core 2) direction is provided in an annular shape in the stator core 2. In other words, a plurality of the slots 2a is provided at equal intervals in the circumferential direction of the stator core 2.

Each of the slots 2a is formed so that a cross-sectional shape in the radial direction of the stator core 2 extends radially from the inner circumferential edge of the stator core 2 towards an outer side in the radial direction. Each of the slots 2a is in communication with a slot 2b extending in the rotational-axis direction formed at equal intervals in the circumferential direction on the inner-circumferential face of the stator core 2.

In addition, the stator core 2 is formed by laminating a plurality of copper sheets 20 having six projecting portions 21 (21a to 21f) that project outwards at the outer circumference. These six projecting portions 21 (21a to 21f) are formed at equal intervals in the circumferential direction. In addition, the copper sheets 20 are laminated so that the projecting portions 21 (21a to 21f) align in a laminating direction, whereby six protrusions 5 (5a to 5f) projecting outwards are formed at equal intervals in the circumferential direction on the outer circumference of the stator core 2.

Fastening holes 22 (22a to 22f) are formed in the six projecting portions 21 (21a to 21f), respectively, and a fastening member (not illustrated) is inserted and fastened to the fastening holes 22 (22a to 22f), whereby the stator core 2 is formed.

The coil 3 is formed from a plurality of coil elements 4 in which a plurality of electrical conductors is bundled to form a substantially U-shape. The head parts of the plurality of coil elements 3 are molded in a substantially S-shape in a plan view. This coil 3 is formed in the following way.

First, as shown in FIG. 1, in a state in which the plurality of coil elements 4 is aligned in an annular shape while layering in the circumferential direction, the leading end 41 of each electrical conductor 40 is inserted in the respective slots 2a. At this time, the stator core 2 is in a state in which the fastening members (not illustrated) are inserted and temporarily joined to the fastening holes 22 (22a to 22f) (state in which positional shaft can occur). Next, after twisting and bending the leading end 41 of each electrical conductor 40 in the circumferential direction, adjacent leading ends 41 are laser welded. The coil 3 is thereby formed.

Twisting and bending of the leading end 41 of each electrical conductor 40 will be explained in further detail by referencing FIG. 3. Herein, FIG. 3 is a perspective view showing the leading ends 41 of a plurality of the electrical conductors 40.

Figure 3:
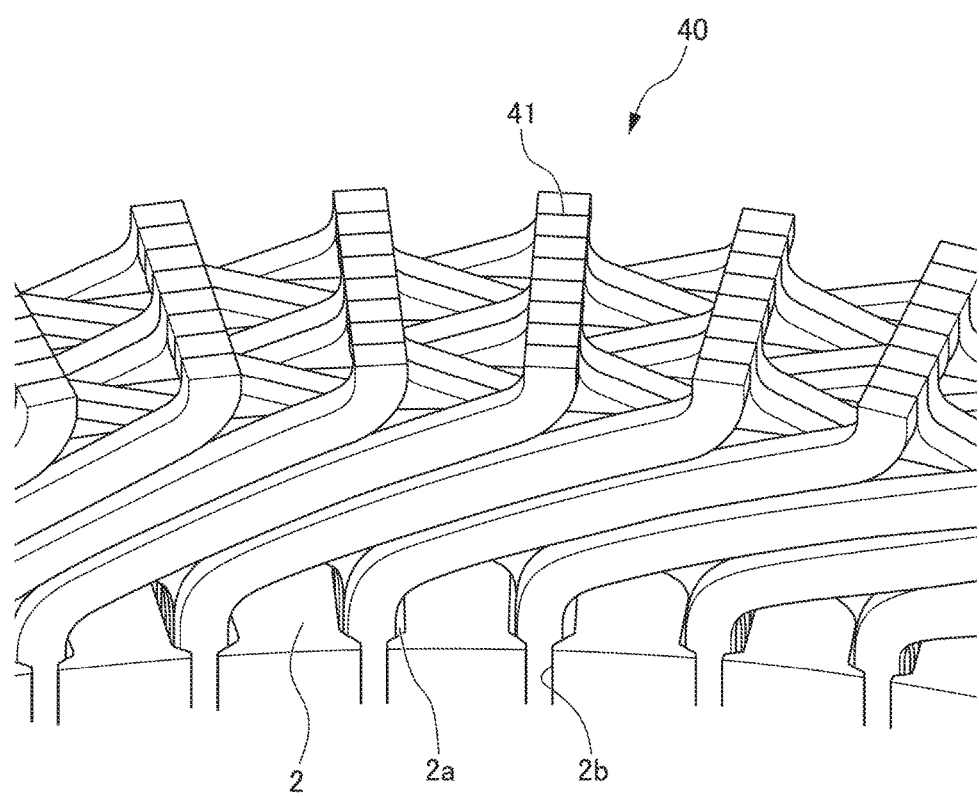
FIG. 3 is a perspective view showing the leading ends of a plurality of electrical conductors.

As shown in FIG. 3, among the leading ends 41 of the plurality of electrical conductors 40 inserted in the respective slots 2a and projecting from the respective slots 2a, the leading end 41 that is the most to the outer side is twisted and bent to one side in the circumferential direction (clockwise in FIG. 3). Next, the second and third leading ends 41 from the outer side are twisted and bent to the other side in the circumferential direction (counter-clockwise in FIG. 3). Next, the fourth and fifth leading ends 41 from the outer side are twisted and bent to the one side in the circumferential direction (clockwise in FIG. 3). After alternately twisting and bending in the reverse direction in this way, the leading end 41 that is the most to the inner side is twisted and bent to the one side in the circumferential direction (clockwise in FIG. 3). Then, finally, each extreme leading end is twisted and bent in the rotational axis direction.

After twisting and bending the leading ends 41 of the plurality of electrical conductors 40 in the above way, the coil 3 is formed by laser welding the leading ends 41 of two electrical conductors 40 adjacent in the radial direction.

Figure 4:
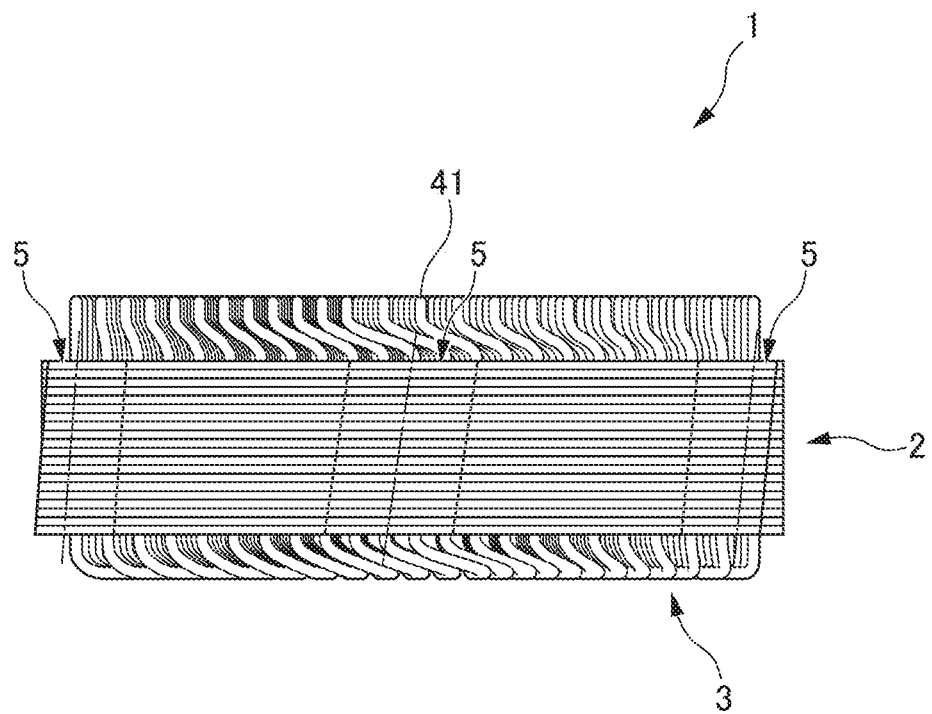
FIG. 4 is a side view of a stator.

However, skew in the circumferential direction occurs from the aforementioned insertion of the electrical conductors 40 into each slot 2a and twisting and bending of the leading ends 41 thereof in the circumferential direction. Herein, FIG. 4 is a side view of the stator 1. In the example shown in FIG. 4, the protrusions 5 formed by the projecting portions 21 of the respective copper sheets 20 aligning are sloped relative to the laminating direction, and skew in the circumferential direction is found to occur. The skew correction device for the stator core 2 according to the present embodiment corrects this skew in the circumferential direction.

Figure 5:
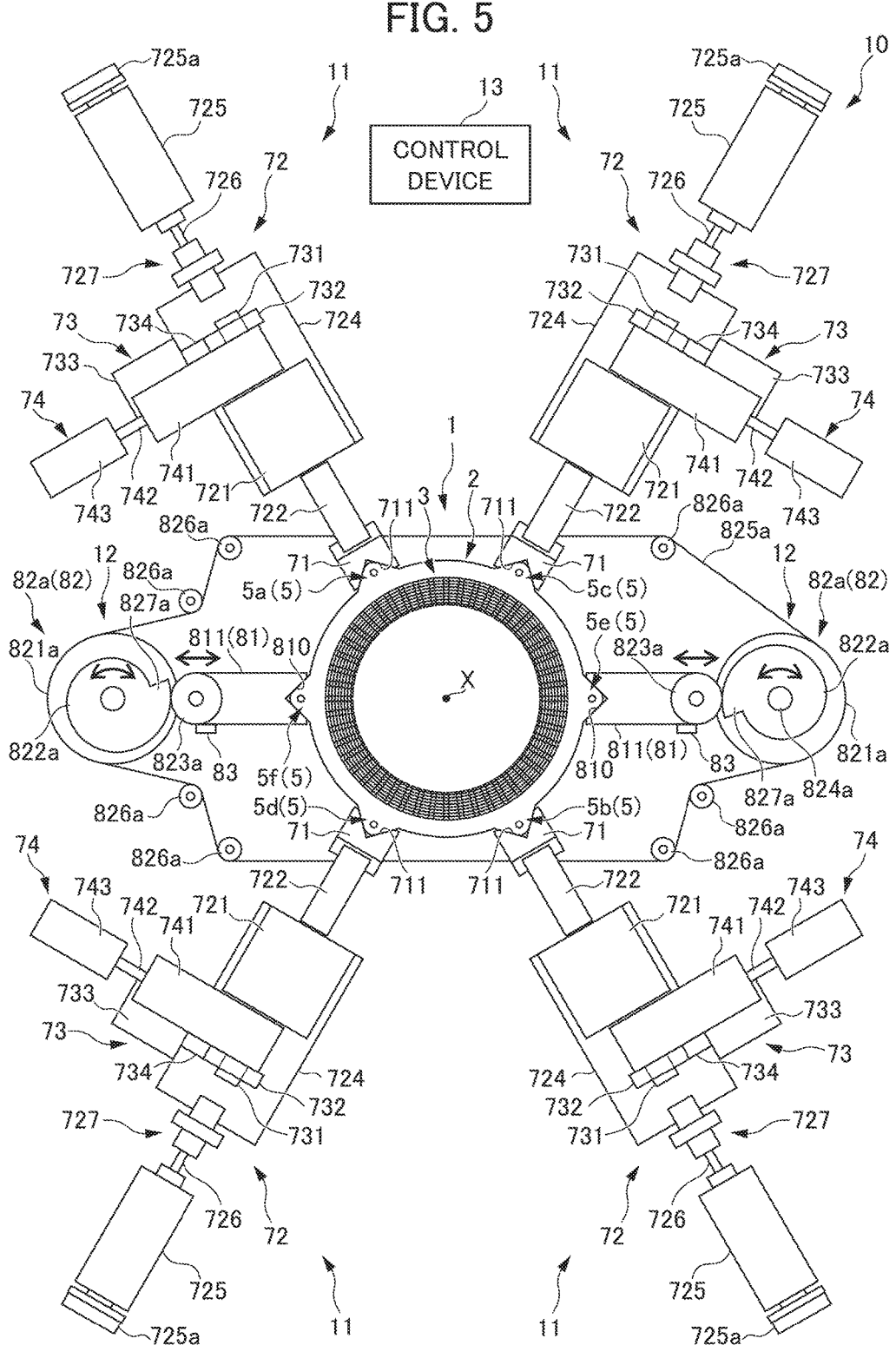
FIG. 5 is a plan view of a stator core skew correction device according to a first embodiment.

FIG. 5 is a plan view of the skew correction device 10 for the stator core 2 according to the present embodiment. As shown in FIG. 5, the skew correction device 10 for the stator core 2 according to the present embodiment is configured to include correction devices 11, a positioning device 12 and a control device 13.

Four of the correction devices 11 are arranged at the respective positions corresponding to a pair of protrusions 5a, 5b formed at positions symmetrical relative to the central axis X of the stator core 2, and similarly, a pair of protrusions 5c, 5d formed at positions symmetrical relative to the central axis X of the stator core 2. In more detail, the four correction devices 11 are respectively arranged on the outer side in the radial direction of the protrusions 5a to 5d.

As shown in FIG. 5, the correction device 11 includes a support member 71, first pressurizing mechanism 72, rotary mechanism 73, and floating mechanism 74.

Figure 6:
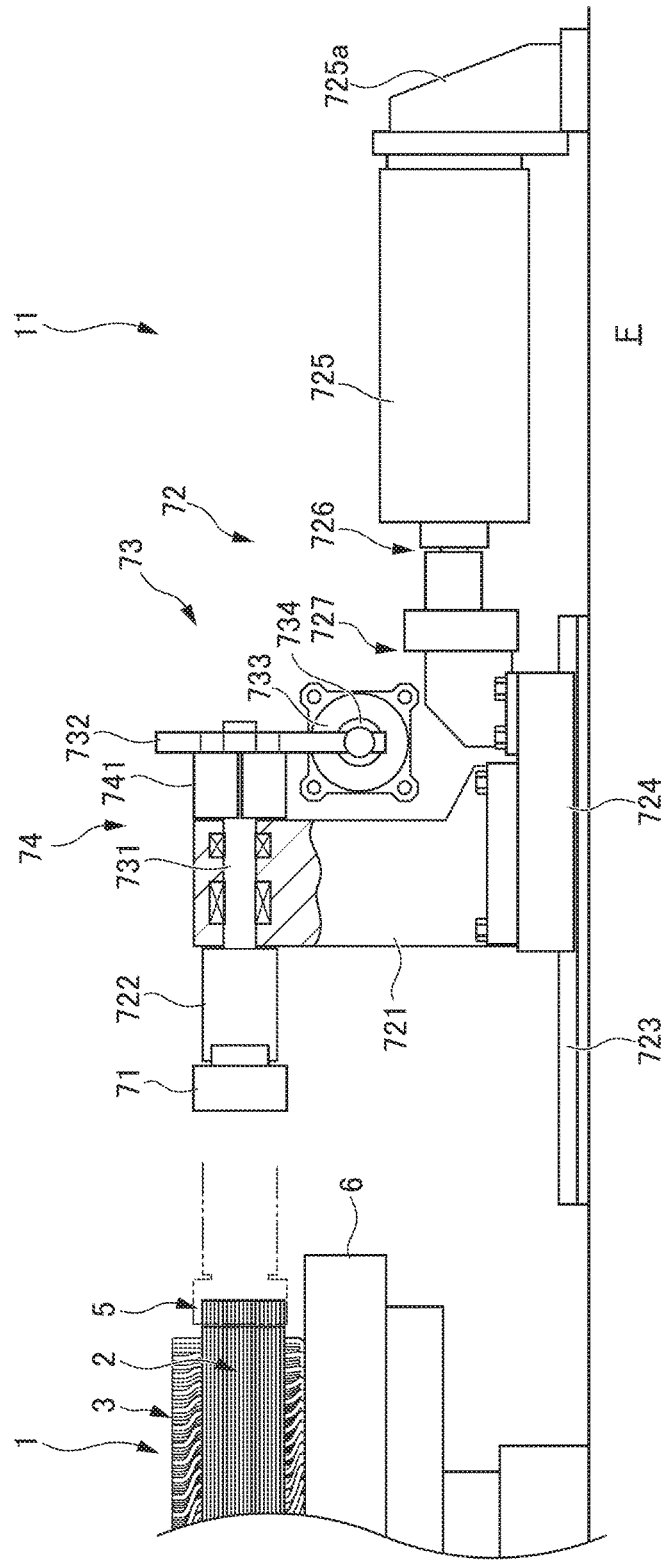
FIG. 6 is a side view of a correction device according to a first embodiment.
Figure 7:
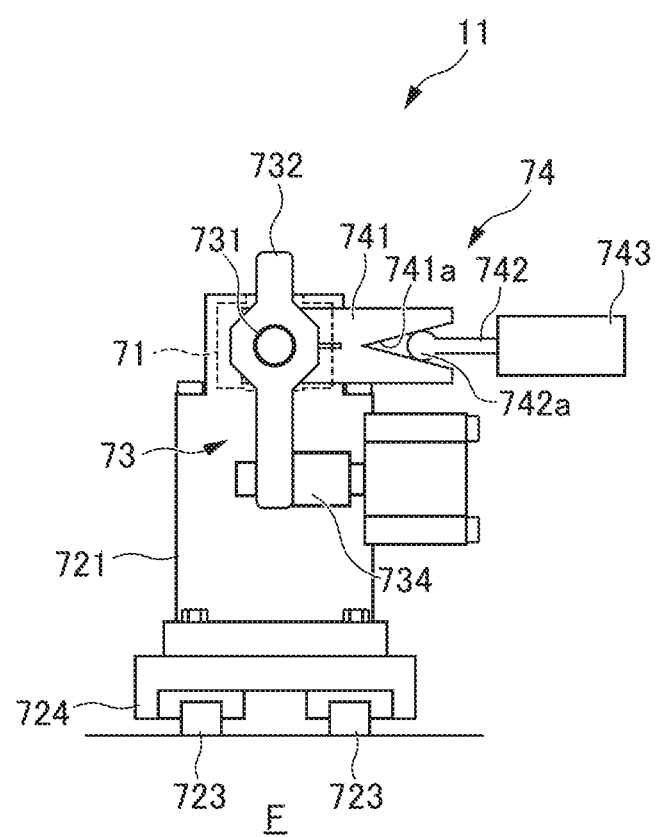
FIG. 7 is a rear view of the correction device according to the first embodiment.

Herein, FIG. 6 is a side view of the correction device 11. In addition, FIG. 7 is a rear view of the correction device 11. However, for convenience, FIG. 7 is illustrated by omitting the first pressurizing mechanism 72 described later.

As shown in FIG. 6, in a state in which the stator 1 configured to include the stator core 2 is placed on a support stand 6 with a leading end 41 side of each electrical conductor 40 facing upwards, skew correction of the stator core 2 is performed by the skew correction device 10.

The support member 71 is provided the most to the stator core 2 side of the correction device 11, i.e. to the leading end side in the pressurizing direction by the pressurizing mechanism 72 described later. The support member 71 is configured by a V-shaped block member in which a V-shaped groove 711 in a plan view extends in the vertical direction (laminating direction) (refer to FIG. 5). The thickness in the vertical direction of the support member 71 is substantially the same as the lamination thickness of the stator core 2. The base end side of the support member 71 is connected to the pressurizing member 722 described later.

The support member 71 thereby becomes able to support the protrusions 5 from outside by being pressed to the inner side in the radial direction by the first pressurizing mechanism 72 described later, and the V-shaped grooves 711 abutting the outer circumferential face of the protrusions 5.

The first pressurizing mechanism 72 includes a base part 721, a pressurizing member 722, a slide rail 723, a slider 724, a cylinder 725, and a piston 726.

The base part 721 is supported by the slider 724 that is movable on the slide rail 723 extending in the radial direction on the floor F.

The pressurizing member 722 has a leading end side thereof connected to the aforementioned support member 71. In addition, the base end side thereof is connected to a rotary shaft 731 described later that is supported to be rotatable to the base part 721.

The cylinder 725 is fixed on the floor F via a fixing part 725a, and is provided to extend in the extending direction of the slide rail 723. The piston 726 is housed to be slidable in this cylinder 725. The leading end of the piston 726 is connected to the slider 724 via a connecting member 727.

The first pressurizing mechanism 72 thereby becomes able to press the support member 71 towards the radial inner side of the stator core 2.

The rotation mechanism 73 includes a rotating shaft 731, link member 732, motor 733, and lead screw part 734.

The rotating shaft 731 is provided to extend in the radial direction and is supported to be rotatable in an upper part of the base part 721. The leading end side of the rotating shaft 731 is connected to the support member 71 via the pressurizing member 722. In addition, the base end side thereof is connected to the link member 732 described later.

The link member 732 is configured by an elongated member, and one end thereof is connected to the rotating shaft 731. In addition, the other end side thereof is connected to a lead screw part 734 described later.

The motor 733 is supported by the base part 721. The rotating shaft of the motor 733 is connected to the lead screw part 734.

The lead screw part 734 is configured by a main body and a lead screw housed in this main body and threading with the inner face thereof. When this lead thread part receives the rotational force of the motor 733 and rotates, the rotating shaft 731 rotates via the link member 732 by the main body advancing and retracting in a substantially horizontal direction (left/right direction in FIG. 7) that is substantially orthogonal to the rotating shaft 731.

Therefore, the rotation mechanism 73 becomes able to correct skew in the circumferential direction, by causing the support member 71 to rotate in a direction in which skew in the circumferential direction is corrected, in a state supporting the protrusions 5 from outwards by pressuring the support members 71 with the first pressurizing mechanisms 72.

The floating mechanism 74 includes a V-groove block 741, cam follower 742, and cylinder part 743.

The V-groove block 741 is provided to extend in a substantially horizontal direction (left/right direction in FIG. 7) that is substantially orthogonal to the rotating shaft 731, and the rotating shaft 731 is connected to one end side thereof (left side in FIG. 7). In addition, a V-shaped groove 741a when viewing from the radial direction is formed in the other end side thereof (right side in FIG. 7).

The cam follower 742 is provided to extend in a substantially horizontal direction (left/right direction in FIG. 7) that is substantially orthogonal to the rotating shaft 731, and has a cam 742a formed in a substantially circular shape in one end thereof (left side end in FIG. 7). In addition, the cylinder part 743 described later is connected to the other end side thereof (right side in FIG. 7), and the cam 742a advances and retracts within the groove 741a of the V-groove block 741 by the cylinder part 743 driving.

The cylinder part 743 is supported to the base part 721 by a connection member that is not illustrated. The cylinder part 743 is configured to include a cylinder and a piston that slides inside this cylinder, and the other end side of the cam follower 742 is connected to the leading end side of this piston.

Figure 8A:
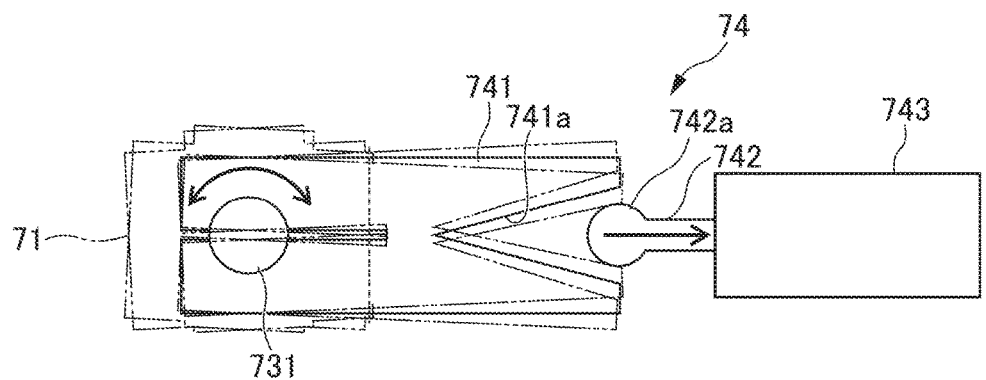
FIG. 8A is a schematic diagram showing a floating state of a floating mechanism according to the first embodiment.

Herein, FIG. 8A is a schematic diagram showing a floating state of the floating mechanism 74. In addition, FIG. 8B is a schematic diagram showing a non-floating state of the floating mechanism 74.

As shown in FIG. 8A, when the piston of the cylinder part 743 retracts in a direction distancing from the rotating shaft 731, the cam follower 742 moves to the side of the cylinder part 743, in accordance with the arrow. At this time, the cam 742a moves until the vicinity of an opening of the groove 741a of the V-groove block 741. When this is done, a space is formed between the vertical wall face of the groove 741a and the cam 742a, and the V-groove block 741 connected to the rotating shaft 731 becomes movable by the amount of this space. In other words, as a result of the floating mechanism 74 entering the floating state, the support member 71 also enters a floating state able to rotate by the amount of the above-mentioned space around the rotating shaft 731. The support member 71 rotates so as to follow the protrusion 5 that is displaced in the circumferential direction, and becomes able to reliably support the protrusion 5 by the support member 71.

Figure 8B:
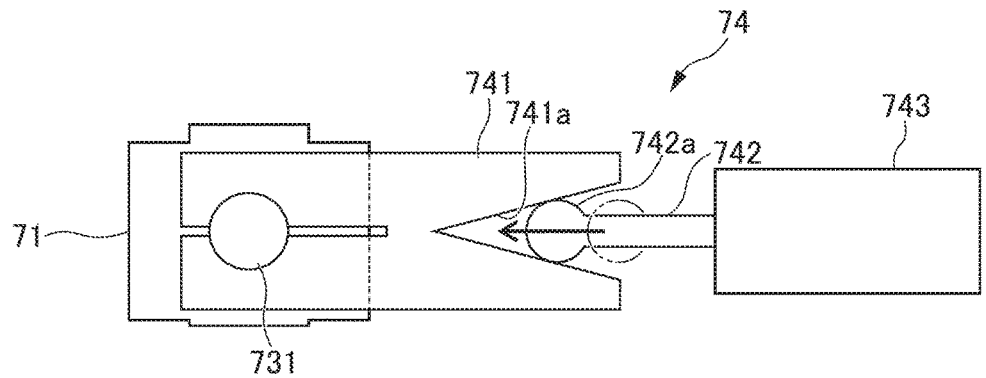
FIG. 8B is a schematic diagram showing a non-floating state of the floating mechanism according to the first embodiment.

On the other hand, as shown in FIG. 8B, when the piston of the cylinder part 743 advances in a direction approaching the rotating shaft 731, the cam follower 742 moves to the rotating shaft 731 side, in accordance with the arrow. At this time, the cam 742a moves until abutting the vertical wall face of the groove 741a of the V-groove block 741. When this is done, rotation of the V-groove block 741 is prohibited by the cam 742a abutting the vertical wall face of the groove 741a. In other words, as a result of the floating mechanism 74 entering a non-floating state, the support member 71 also enters a non-floating state unable to rotate around the rotating shaft 731. By causing the support member 71 to rotate according to rotation by the aforementioned rotation mechanism 73, it thereby becomes possible to correct skew of the protrusions 5 in the circumferential direction.

Returning back to FIG. 5, two of the positioning devices 12 are arranged at respective positions opposing the pair of protrusions 5e, 5f formed at positions that are symmetrical relative to the central axis X of the stator core 2. In more detail, the two positioning devices 12 have the same configurations as each other, and one is arranged at the outer side in the radial direction of each of the protrusions 5e, 5f.

As shown in FIG. 5, the positioning device 12 includes a positioning member 81, second pressurizing mechanism 82, and measuring unit 83.

The positioning member 81 is provided the most to the stator core 2 side of the positioning device 2, i.e. to a leading end side in the pressurizing direction from the second pressurizing mechanism 82 described later. The positioning member 81 is configured by a V-shaped block material in which a V-shaped groove 810 in a plan view is formed in a predetermined thickness in the vertical direction (laminating direction) in a leading end side of s stator core 2 side. The thickness in the vertical direction of the positioning member 81 is substantially the same as the lamination thickness of the stator core 2. The base end side of the positioning member 81 is connected to a second pressurizing mechanism 82 described later.

In addition, the positioning member 81 is configured to be divided into the two of an upper member 811 provided at an upper side, and a lower member 812 provided at a lower side. In the plan view of FIG. 5, only the upper member 811 is visible. This upper member 811 and lower member 812 have V-shaped block forms that are the same as each other, and are pressurized individually inwards in the radial direction by the second pressurizing mechanisms 82 described later.

This upper member 811 and lower member 812 each stop, when pressurized inwards in the radial direction by the second pressurizing mechanism 82, by the V-shaped groove 810 abutting the outer circumferential face of the protrusion 5.

The second pressurizing mechanism 82 is configured from a second upper pressurizing mechanism 82a that pressurizes the upper member 811 inwards in the radial direction, and a second lower pressurizing mechanism that pressurizes the lower member 812 inwards in the radial direction. In other words, the second pressurizing mechanism 82 pressurizes each of the upper member 811 and lower member 812 inwards in the radial direction individually.

It should be noted that the second lower pressurizing mechanism is arranged to be overlapping below the second upper pressurizing mechanism 82a, and thus only the second upper pressurizing mechanism 82a is visible in the plan view of FIG. 5. This second upper pressurizing mechanism 82a and second lower pressurizing mechanism have the same configurations; therefore, only the configuration of the second upper pressurizing mechanism 82a will be explained in detail hereinafter.

As shown in FIG. 5, the second upper pressurizing mechanism 82a includes a rotating shaft 821a, eccentric cam 822a, roller 823a, motor 824a, belt 825a, and guide roller 826a.

The rotating shaft 821a is provided to extend in the vertical direction. The rotating shaft 821a is connected to the rotating shaft of the motor 824a, and rotates according to the rotational driving of the motor 824a. The belt 825a described later engages with the outer circumferential face of the rotating shaft 821a.

It should be noted that the rotating shaft 821a does not couple with the rotating shaft of the second lower pressurizing mechanism that is not illustrated, and these rotating shafts are made so as to rotate individually.

The eccentric cam 822a is connected to the rotating shaft of the motor 824a along with the rotating shaft 821a, and rotates along with the rotating shaft 821a according to the rotational driving of the motor 824a. The roller 823a abuts with the outer circumferential face of the eccentric cam 822a. The eccentric cam 822a has an expanded-diameter part 827a that gradually expands in diameter in the circumferential direction thereof.

It should be noted that the motor 824a is provided only to one among the two second upper pressurizing mechanisms 82a, 82a (right side in FIG. 5). This is because the two second upper pressurizing mechanisms 82a, 82a engage to work together with the belt 825a described later, thereby making a configuration in which the rotational driving force of the motor 824a is delivered to both of the second upper pressurizing mechanisms 82a, 82a. This is the same for the two second lower pressurizing mechanisms that are not illustrated.

The roller 823a is connected to the base end side of the upper member 811 (outer side in radial direction). The roller 823a abuts with the outer circumferential face of the eccentric cam 822a as mentioned above, and is provided to be slidingly movable in the radial direction while rotating on the slide rail that is not illustrated, by working together with the rotation of the eccentric cam 822a. The upper member 811 thereby also becomes slidingly movable in the radial direction.

It should be noted that the measuring unit 83 that measures the moving distance of each member is provided to both the upper member 811 and the lower member 812.

The belt 825a is configured from one annular endless belt. The belt 825a engages with the respective outer circumferential faces of the rotating shafts 821a, 821a, and is arranged to be guided by seven guide rollers 826a. In other words, the belt 825a is wound around to engage with the respective outer circumferential faces of the two rotating shafts 821a, 821a, whereby these two rotating shafts 821a, 821a become rotatable in the same direction synchronously.

The two second upper pressurizing mechanisms 82a, 82a having the above configuration operate as follows. It should be noted that the second lower pressurizing mechanism also operates similarly to these two upper pressurizing mechanisms 82a, 82a.

First, in the initial state prior to causing the motor 824a to drive, the upper members 811, 811 are arranged at positions separated from the protrusions 5e, 5f to outwards in the radial direction. At this time, the eccentric cams 822a, 822a are arranged at positions at which the respective expanded diameter parts 827a, 827a are not abutting the roller 823a, 823a, respectively. In other words, in the initial state, the eccentric cams 822a, 822a have the respective small diameter parts abutting the rollers 823a.

Next, the motor 824a is made to drive, and the rotating shaft 821a of one (right side in FIG. 5) is made to rotate clockwise. When this is done, since the belt 825a is wound around the two rotating shafts 821a, 821a to work together with each other, these rotating shafts 821a, 821a rotate clockwise in the same direction synchronously. In other words, the two second upper pressurizing mechanisms 82a, 82a similarly operate synchronously.

More specifically, when the rotating shafts 821a, 821a rotate clockwise, the eccentric cams 822a, 822a also rotate clockwise by working together with these. At this time, the expanded diameter parts 827a, 827a of the eccentric cams 822a, 822a respectively abut the rollers 823a, 823a, whereby the respective rollers 823a, 823a slidingly move to the inner side in the radial direction, while rotating. When this is done, the upper members 811, 811 working together with the rollers 823a, 823a also slidingly move to the inner side in the radial direction. As a result thereof, the V-shaped grooves 810, 810 abut the outer circumferential faces of the protrusions 5e, 5f, and press the protrusions 5e, 5f to the inner side in the radial direction. Herein, FIG. 5 shows a state in which the grooves 810, 810 are pressing the protrusions 5e, 5f to the inner side in the radial direction.

In this way, the second upper pressurizing mechanisms 82a, 82a make so that the protrusions 5e, 5f squeeze together to the inner side in the radial direction synchronously, by way of the grooves 810, 810 of the upper members 811, 811. Then, by the balance of pressurizing force of the synchronized two upper members 811, 811 being achieved, these naturally stop.

Figure 9:
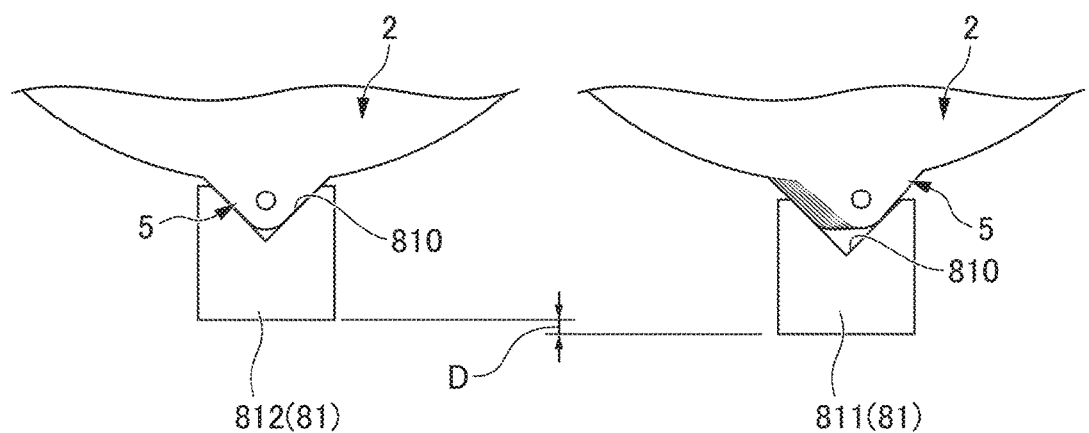
FIG. 9 is a view showing the relationship between a stop position of a positioning member and skew amount.

Herein, FIG. 9 is a view showing the relationship between the stop position of the positioning member 81 and the skew amount. FIG. 9 shows the stop positions of each of the upper member 811 and the lower member 812.

As shown in FIG. 9, when skew in the circumferential direction occurs in the stator core 2, the protrusions 5 slant relative to the laminating direction (vertical direction) as mentioned above. This slanting is normally more severe towards the upper side, due to the twisting and bending, etc. of the leading ends 41 of the electrical conductors 40. For this reason, in the present embodiment, first, the second lower pressurizing mechanism that is on a lower side at which the skew amount in the circumferential direction is smaller is made to drive, whereby the lower member 812 is made to abut and position the protrusion 5, followed by making the second upper pressurizing mechanism 82a on an upper side having larger skew amount to drive, whereby the upper member 911 is made to abut the protrusion 5. When this is done, the position at which the upper member 811 stops by the groove 810 of the upper member 811 abutting the outer circumferential face at an upper side of the protrusion 5 becomes more to the outer side in the radial direction, relative to the position at which the lower member 812 stops by the groove 810 of the lower member 812 abutting the outer circumferential face at a lower side of the protrusion 5. Then, the distance D in the radial direction between both stop positions at this time is proportional to the skew amount as described later.

Therefore, the aforementioned measuring unit 83 measures the distance D in the radial direction between the position at which the upper member 811 stopped by the groove 810 of the pressurized upper member 811 abutting the protrusion 5, and the position at which the lower member 812 stopped by the groove 810 of the pressurized lower member 812 abutting the protrusion 5. More specifically, the measuring unit 83 is configured to include a linear gauge, for example, and after measuring the stroke amount in the radial direction of the upper member 811 and the stroke amount in the radial direction of the lower member 812 by way of this linear gauge, measures the distance D in the radial direction between the two from difference of these. The measurement signal of the measured distance D is outputted to a control device 13 described later.

The measurement period of the distance D by this measuring unit 83 is not particularly limited, and may be in the middle of executing skew correction, or may be before or after this.

The control device 13 is configured to include a skew amount acquisition unit, a correction device control unit, and positioning device control unit, none of which are illustrated. The measurement signal from the measuring unit 83 is inputted to this control device 13.

The skew amount acquisition unit calculates and acquires the skew amount in the circumferential direction according to the distance D measured by the measuring unit 83. Herein, FIG. 10 is a graph showing the relationship between the distance D (difference in stroke amount) and the skew amount.

Figure 10:
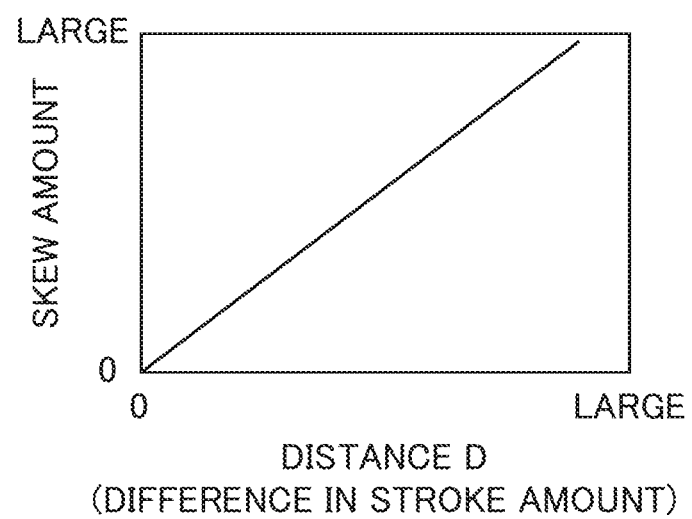
FIG. 10 is a graph showing the relationship between a distance D (difference in stroke amount) and skew amount.

As shown in FIG. 10, a proportional relationship is established in the difference between the stroke amount of the upper member 811 and the stroke amount of the lower member 812, i.e. between the distance D in the radial direction when both stop and the skew amount. Therefore, from the relationship graph thereof, it is possible to calculate the skew amount, by measuring the difference between the stroke amount of the upper member 811 and the stroke amount of the lower member 812, i.e. distance D in the radial direction when both stop. This relationship graph is acquired by performing experiments in advance, and is stored in the skew amount acquisition unit of the control device 13.

The correction device control unit outputs a control signal to control the driving of the correction device 11. More specifically, skew correction is executed by outputting control signals to the first pressurizing mechanism 72, rotation mechanism 73 and floating mechanism 74 of the correction device 11. In addition, the skew is more reliably eliminated by this skew device control unit controlling the rotation of the rotation mechanism 73 according to the skew amount acquired by the skew amount acquisition unit.

The positioning device control unit outputs a control signal to control the driving of the positioning device 12. More specifically, positioning of the positioning member 81 and measurement of the distance D are executed by outputting control signals to the second pressurizing mechanism 82 of the positioning device 12 and the measuring unit 83.

The operation of the skew correction device 10 for the stator core 2 including the above configuration will be explained along with a skew correction method according to the present embodiment.

The skew correction method according to the present embodiment is configured to include a supporting step, correcting step, and skew amount acquiring step. This skew correction method is executed by the aforementioned skew correction device 10 operating.

In the supporting step, by pressing the support members 71 towards the inner side in the radial direction of the stator core 2 against at least one of the protrusions 5 of the stator core 2, in the present embodiment, the pair of protrusions 5a, 5b and the pair of protrusions 5c, 5d, which are symmetrical relative to the central axis X, these protrusions 5 are supported from outwards.

At this time, by establishing the floating mechanism 74 in the floating state, the respective support members 71 support the respective protrusions 5, after rotating so as to follow the outer circumferential face of each protrusion 5 that is slanted by the copper sheets 20 being displaced in the circumferential direction.

In the correcting step, in a state supporting the protrusions 5 from outwards by the support member 71, the support members 71 are made to rotate in a direction in which the skew in the circumferential direction is corrected (counterclockwise in the present embodiment), by the rotation mechanism 73. At this time, the driving force of the rotation mechanism 73 is transmitted to the support member 71 by establishing the floating mechanism 74 in a non-floating state. The skew in the circumferential direction is thereby corrected.

In the skew amount acquiring step, the skew amount in the circumferential direction is acquired. More specifically, first, the upper member 811 and the lower member 812 of the positioning member 81 are each pressed individually to the inner side in the radial direction until stopping, by the second pressurizing mechanism 82. When both members have stopped, the difference between the stroke amounts of both members, i.e. distance D in the radial direction of the stop positions of both members, is measured by the measuring unit 83. Next, the skew amount is calculated and acquired by the skew amount acquisition unit according to the measured distance D.

It should be noted that this skew amount acquiring step is executed in at least any of before the correcting step, in the middle of the correcting step, and after the correcting step. In the case of executing before the correcting step, it is possible to set the rotation amount of the rotation mechanism 73 according to the acquired skew amount. In addition, in the case of executing in the middle of the correcting step, it is possible to execute correction of the skew amount while confirming the skew amount. Furthermore, in the case of executing after the correcting step, it is possible to confirm whether or not the skew was eliminated.

The following effects are exerted according to the skew correction device 10 for the stator core 2 and the skew correction method according to the present embodiment.

The skew correction device 10 for the stator core 2 according to the present embodiment is provided with the support members 71 capable of supporting the protrusions 5 of the stator core 2 from outwards, and the first pressurizing mechanisms 72 that press these support members 71 towards the inner side in the radial direction of the stator core 2. In addition, in a state supporting the protrusions 5 from outwards by pressing the support members 71 by way of the first pressurizing mechanisms 72, the rotation mechanisms 73 are provided that correct the skew in the circumferential direction by causing the support members 71 to rotate in a direction in which skew in the circumferential direction is corrected (counter-clockwise in the present embodiment) by the rotating shafts 731. It is thereby possible to easily correct skew in the circumferential direction of the stator core 2 arising due to insertion of the electrical conductors 40 into each slot 2a and twisting and bending in the circumferential direction of the leading ends 41 thereof, without conducting special processing, etc. on the stator core 2, for example.

In addition, with the skew correction device 10 of the stator core 2 according to the present embodiment, the support members 71 of the correction device 11 are each arranged to correspond to the pair of protrusions 5a, 5b and pair of protrusions 5c, 5d formed at positions that are symmetrical relative to the central axis X of the stator core 2. Since it is thereby possible to correct skew in the circumferential direction via the pair of protrusions 5 formed at positions that are symmetrical relative to the central axis X of the stator core 2, skew can be corrected more easily.

In addition, the skew correction device 2 for the stator core 2 according to the present embodiment is provided with the positioning member 81 that supports the protrusions 5e, 5f at which the support member 71 is not arranged, from outwards by the upper member 811 and the lower member 812, and the second pressurizing mechanism 82 that individually presses this upper member 811 and lower member 812 to the inner side in the radial direction, respectively. In addition, the control device 13 is provided with the measuring unit 83 that measures the distance D in the radial direction between the position at which the pressurized upper member 811 abuts the protrusion 5 and stops, and the position at which the pressurized lower member 812 abuts the protrusion 5 and stops, and a shift amount acquisition unit that calculates and acquires a skew amount in the circumferential direction according to the measured distance D.

Herein, the distance D in the radial direction between the position at which the pressurized upper member 811 abuts the protrusion 5 and stops and the position at which the pressurized lower member 812 abuts the protrusion 5 and stops is proportional to the skew amount in the circumferential direction; therefore, the skew amount can be acquired by measuring this distance D.

It is thereby possible to set the rotation amount of the rotation mechanism 73 according to the acquired skew amount, by acquiring the skew amount before correction, for example. In addition, it is possible to execute skew correction while confirming the skew amount, by acquiring the skew amount in the middle of correcting. Furthermore, it is possible to confirm whether or not skew has been eliminated by acquiring the skew amount after correction.

It should be noted that similar effects to the aforementioned effects of the skew correction device 10 are exerted by the skew correction method of the stator core 2 according to the present embodiment.

Second Embodiment

Figure 11:
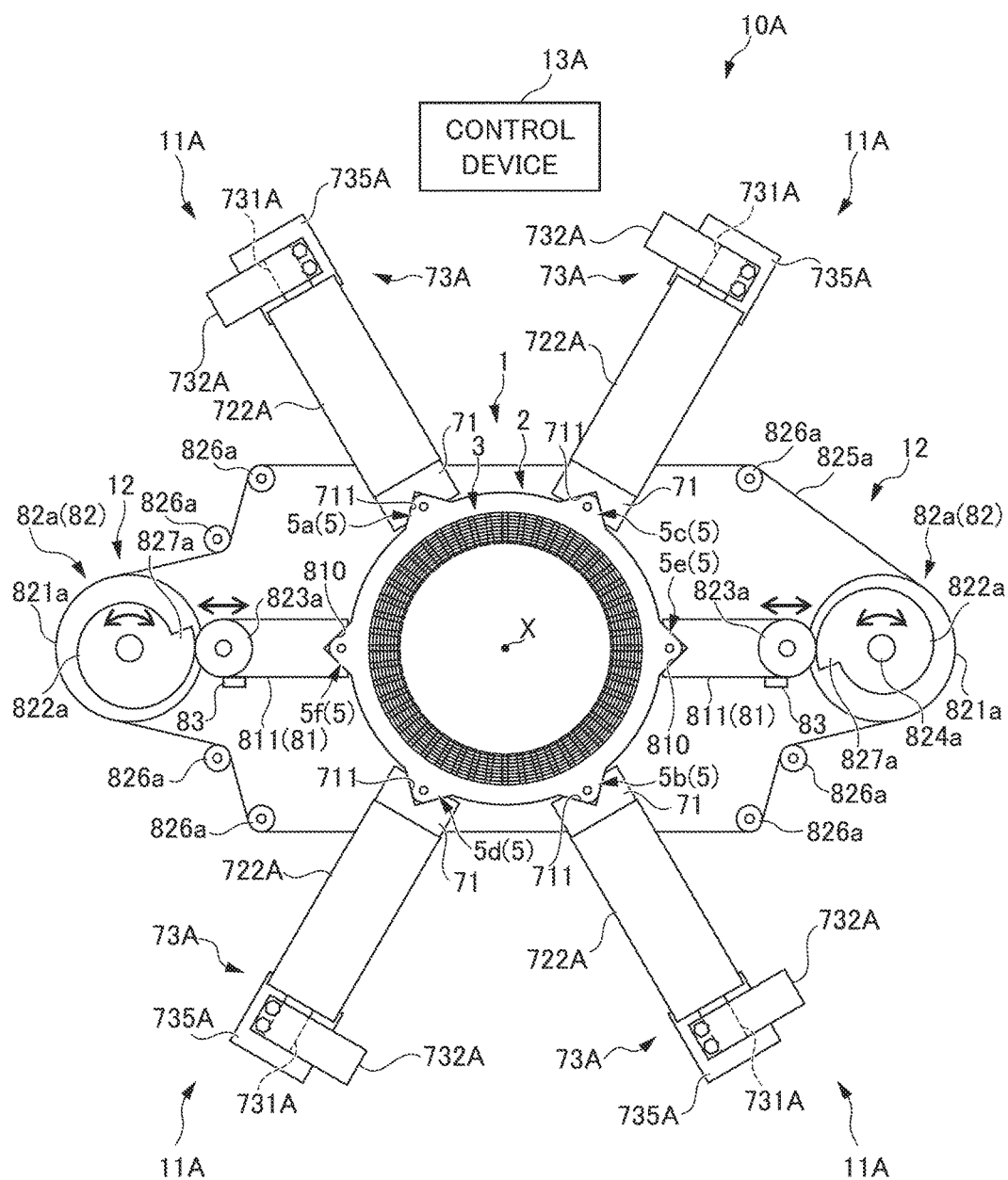
FIG. 11 is a plan view of a stator core skew correction device according to a second embodiment.
Figure 12:
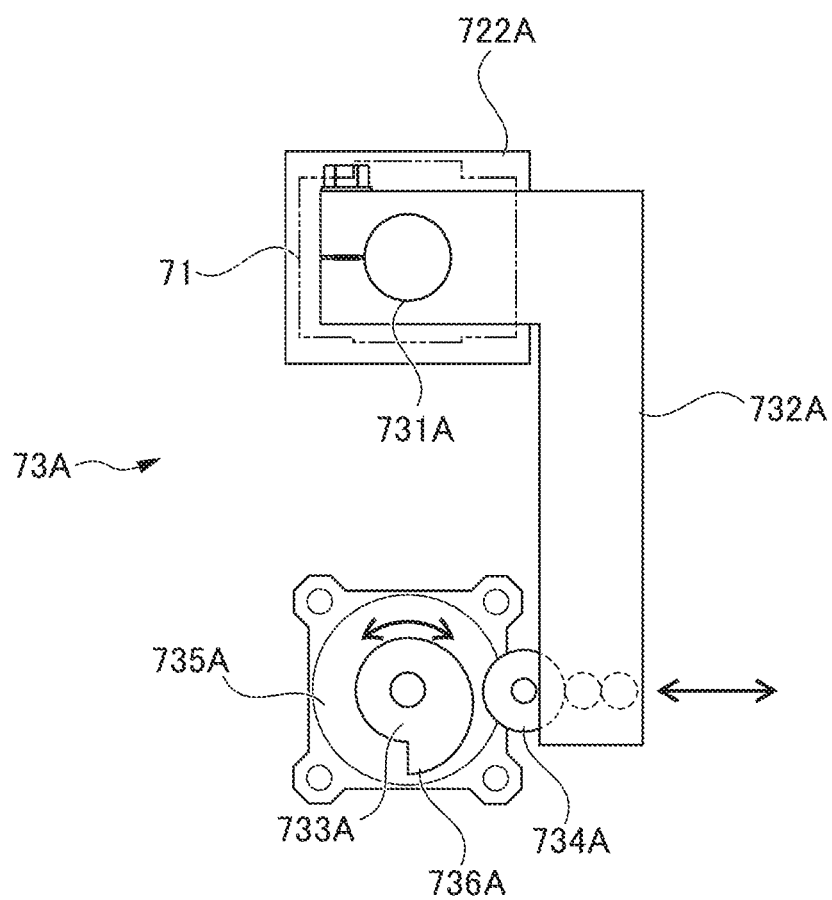
FIG. 12 is a rear view of the correction device according to the second embodiment.

A skew correction device 10A for the stator core 2 according to the present embodiment is basically the same configuration compared to the first embodiment, other than the configuration of the rotation mechanism and floating mechanism of the correction device differing. Herein, FIG. 11 is a plan view of the skew correction device 10A for the stator core 2 according to the present embodiment. FIG. 12 is a rear view of the correction device 11A according to the present embodiment. It should be noted that FIGS. 11 and 12 illustrate by omitting descriptions of the first pressurizing mechanism 72, for convenience.

The rotation mechanism 73A of the correction device 11A according to the present embodiment differs from the first embodiment in the point combining also with the floating mechanism.

As shown in FIG. 12, the rotation mechanism 73A of the present embodiment includes a rotating shaft 731A, lever member 732A, eccentric cam 733A, roller 734A and motor 735A.

The rotating shaft 731A is provided to extend in the radial direction. The leading end side of the rotating shaft 731A is connected to the support member 71 via a pressurizing member 722A of the first pressurizing mechanism 72. In addition, the base end side thereof is connected to the lever member 732A described later.

The lever member 732A is configured by a substantially L-shaped member, and an end on the short arm side thereof is connected to the rotating shaft 731A. In addition, the roller 734A is provided to the end of the long arm side thereof.

The eccentric cam 733A is connected to the rotating shaft of the motor 735A. The eccentric cam 733A has an expanded diameter part 736A that gradually expands in diameter in the circumferential direction thereof. This eccentric cam 733A rotates counter-clockwise by receiving the rotational force of the motor 735A, and when the expanded diameter part 736A abuts the roller 734A, the roller 734A moves to the right direction. When this is done, the lever member 732A is pushed to the roller 734A, and rotates counter-clockwise about the rotating shaft 731A. As a result thereof, the support member 71 connected to the lever member 732A via the rotating shaft 731A rotates counter-clockwise.

Therefore, the rotation mechanism 73A becomes able to correct skew in the circumferential direction, by causing the support member 71 to rotate in a direction in which the skew in the circumferential direction is corrected (counter-clockwise in the present embodiment), in a state supporting the protrusion 5 from outwards by pressing the support member 71 by way of the first pressurizing mechanism 72.

In addition, when the eccentric cam 733A is made to rotate clockwise, which is the opposite direction to the skew correction in advance, it enters a state in which the expanded diameter part 736A of the eccentric cam 733A is separated from the roller 734A. In this state, the lever member 732A is in a floating state capable of rotating about the rotating shaft 731A only by the amount of the space between the eccentric cam 733A and the roller 734A. Therefore, when pressing the support member 71 towards the protrusion in this state, it is possible for the support member 71 to support the protrusion 5 from outwards after rotating clockwise so as to follow the outer circumferential face of the protrusion.

Similar effects as the first embodiment are exerted according to the skew correction device 10A for the stator core 2 according to the present embodiment provided with the above configuration.

It should be noted that the present invention is not to be limited to the above-mentioned embodiments, and that modifications and improvements within a scope that can achieve the objects of the present invention are also encompassed by the present invention.

What is claimed is:

1. A skew correction device for stator cores that corrects a lamination shift in a circumferential direction of a substantially annular stator core formed by laminating a plurality of thin sheets having a plurality of projecting parts projecting outwards at an outer circumference thereof so that the projecting parts align in a laminating direction, the device comprising:
   a support member capable of supporting from outwards a protrusion of the stator core formed by the plurality of projecting parts aligning;
   a means for pressing the support member towards an inner side in a radial direction of the stator core; and
   a means for correcting lamination shift in the circumferential direction, by causing the support member to rotate in a direction in which the lamination shift in the circumferential direction is corrected with the radial direction as an axis of rotation, in a state supporting the protrusion from outwards by pressing the support member by way of the first pressurizing means.

2. The skew correction device for stator cores according to claim 1,
   wherein at least a pair of the protrusions is formed at positions that are symmetrical relative to a central axis of the stator core, and
   wherein the support member supports the pair of the protrusions by being disposed at positions corresponding to at least the pair of the protrusions, respectively.

3. The skew correction device for stator cores according to claim 1, further comprising:
   a positioning member that is configured by an upper member provided at an upper side in the laminating direction and a lower member provided at a lower side in the laminating direction, and that supports from outwards, by way of the upper member and the lower member, the protrusion at which the support member is not disposed;
   a means for pressurizing each of the upper member and the lower member to an inner side in the radial direction individually;
   a means for measuring a distance in the radial direction between a position at which the upper member pressurized by the second pressurizing means abuts the protrusion and stops, and a position at which the lower member pressurized by the second pressurizing means abuts the protrusion and stops; and
   a means for calculating and acquiring a lamination shift amount in the circumferential direction according to the distance measured by the measuring means.

4. The skew correction device for stator cores according to claim 2, further comprising:
   a positioning member that is configured by an upper member provided at an upper side in the laminating direction and a lower member provided at a lower side in the laminating direction, and that supports from outwards, by way of the upper member and the lower member, the protrusion at which the support member is not disposed;
   a means for pressurizing each of the upper member and the lower member to an inner side in the radial direction individually;
   a means for measuring a distance in the radial direction between a position at which the upper member pressurized by the second pressurizing means abuts the protrusion and stops, and a position at which the lower member pressurized by the second pressurizing means abuts the protrusion and stops; and
   a means for calculating and acquiring a lamination shift amount in the circumferential direction according to the distance measured by the measuring means.

5. A skew correction method for stator cores that corrects lamination shift in a circumferential direction of a substantially annular stator core formed by laminating a plurality of thin sheets having a plurality of projecting parts projecting outwards at an outer circumference so that the projecting part align in a laminating direction, the method comprising:
   a supporting step of pressing a support member towards an inner side in a radial direction of the stator core against at least one protrusion of the stator core formed by the plurality of projecting parts aligning, thereby supporting the protrusion from outwards; and
   a correcting step of correcting the lamination shift in the circumferential direction by causing the support member to rotate in a direction in which the lamination shift in the circumferential direction is corrected with the radial direction as a rotation axis.

6. The skew correction method for stator cores according to claim 5, wherein at one pair of the protrusions is formed at positions that are symmetrical relative to a central axis of the stator core, and
   wherein the supporting step supports the pair of the protrusions by arranging the support members at positions corresponding at least to the pair of the protrusions, respectively.

7. The skew correction method for stator cores according to claim 5, further comprising a shift amount acquisition step of acquiring a lamination shift amount in the circumferential direction, in at least any of before the correcting step, during the correcting step and after the correcting step.

8. The skew correction method for stator cores according to claim 6, further comprising a shift amount acquisition step of acquiring a lamination shift amount in the circumferential direction, in at least any of before the correcting step, during the correcting step and after the correcting step.

* * * * *